3,291,510
TUBE FITTING

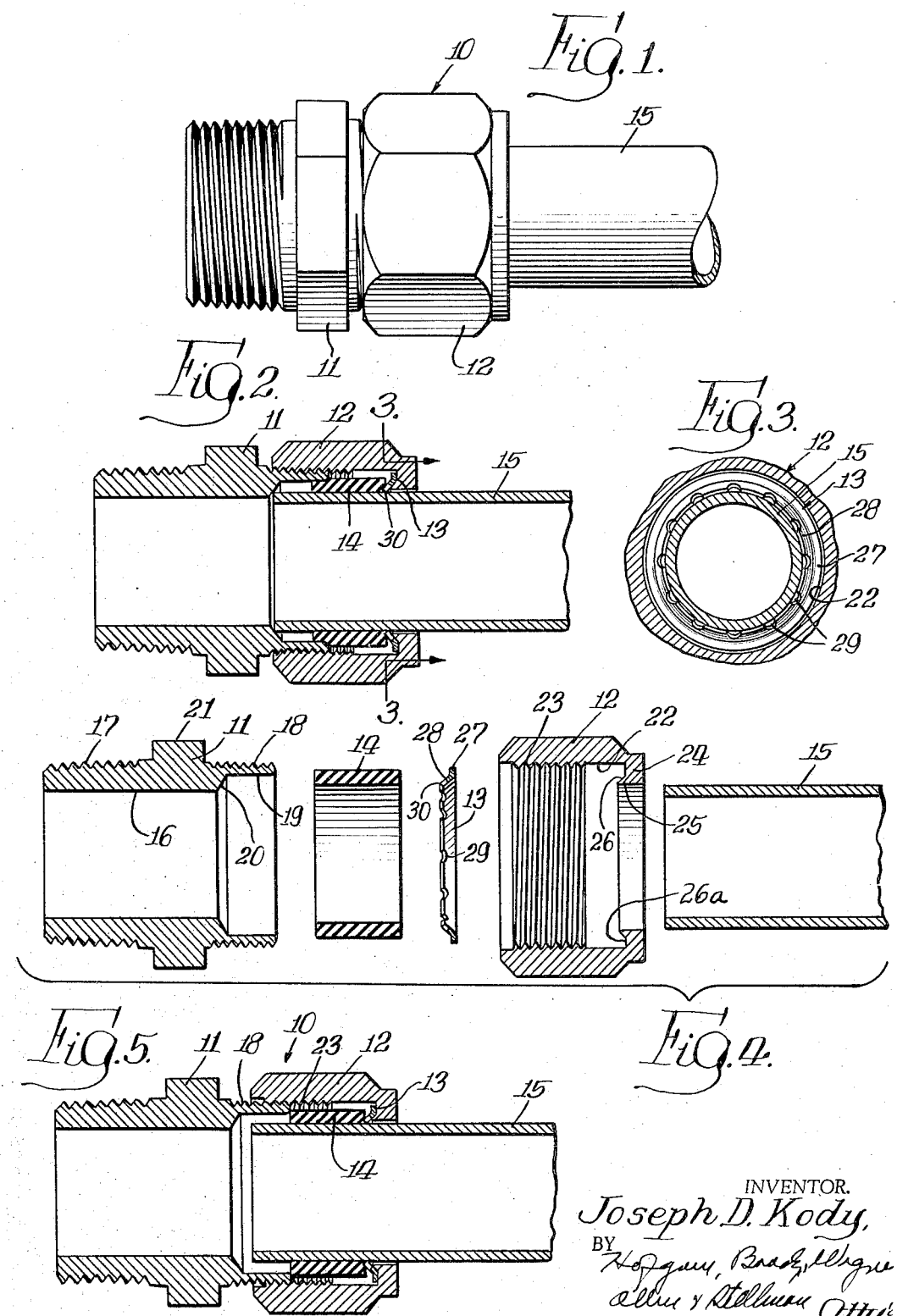

Joseph D. Kody, Arlington Heights, Ill., assignor to Imperial-Eastman Corporation, a corporation of Illinois
Continuation of application Ser. No. 151,689, Nov. 13, 1961. This application July 6, 1965, Ser. No. 472,397
4 Claims. (Cl. 285—340)

This application comprises a continuation of my copending application Serial No. 151,689, filed November 13, 1961, now abandoned.

This invention relates to tube fittings and in particular to high pressure-vibrationproof fittings.

In retaining a tube end in a fitting against longitudinal movement therefrom, it is desirable to provide positive locking means. A problem arises, however, where the fitting is susceptible to substantial vibration as such positive locking means tend to loosen as the result of the vibration and permit slippage of the tubing from the fitting. To solve this problem, fittings have been developed utilizing resilient gripping means which absorb the vibrations and thereby effectively maintain a gripping engagement with the tubing. Where such resilient gripping means, however, are used in relatively high pressure applications, they have not been found to be completely satisfactory as the high pressure tends to cause the tube to slip from the fitting as the result of the somewhat impositive gripping engagement of the resilient means therewith.

The present invention comprehends an improved tube fitting which eliminates the above discussed disadvantages of the known tube fittings and which is capable of withstanding severe vibrations at high pressures.

Thus, a principal object of the present invention is to provide a new and improved tube fitting.

Another object of the invention is to provide a new and improved tube fitting providing substantially positive retention of the tubing notwithstanding severe vibration at high pressure conditions.

A further object of the invention is to provide such a tube fitting including an annular springy retainer for effectively positively gripping the tubing, a sealing and gripping ring co-operating with the retainer for sealingly retaining the tube in the fitting, and means for effectively precluding releasing deformation of the retainer.

Other features and advantages of the invention will be apparent from the following description taken in connection with the accompanying drawing wherein:

FIG. 1 is a side elevation of a fitting embodying the invention having a tube end connected thereto;

FIG. 2 is a diametric section thereof;

FIG. 3 is a transverse section taken substantially along the line 3—3 of FIG. 2;

FIG. 4 is an exploded view thereof; and

FIG. 5 is a diametric section illustrating the arrangement of the fitting and tubing as at the initiation of the securing operation.

In the exemplary embodiment of the invention as disclosed in the drawing, a fittting generally designated 10 is shown to comprise a body 11, a nut 12, a retainer 13, and a sealing sleeve 14. As best seen in FIG. 2, a tube end 15 is sealingly retained in the fitting by the engagement thereof by the retainer 13 and sleeve 14. As will be brought out more fully hereinafter, the retainer 13 effectively positively retains the tube end 15 in the fitting against longitudinal outward slippage thereof and the sleeve 14 assists the retainer 13 in the gripping of the tube as well as in sealing the tube end to the body 11.

Referring now more specifically to FIG. 4, body 11 is shown to comprise a rigid member having a stepped bore 16 therethrough opening inwardly through an exteriorly threaded end 17 of the body and outwardly through an exteriorly threaded outer end 18 of the body. The outer end 19 of the bore 16 is radially enlarged and extends outwardly from a frusto-conical surface 20 at the inner end of the body portion 18. For facilitated installation of the fitting, the body is provided with a plurality of flats 21 intermediate the portions 17 and 18 and arranged in a hexagonal configuration as for engagement by a conventional tool.

Nut 12 comprises a rigid member having an axial bore 22 therethrough having an inner threaded portion 23 arranged for engagement with the threaded end 18 of the body for longitudinal movement of the nut relative to the body as an incident of threaded rotation of the nut portion 23 on the body portion 18. At its outer end, nut 12 is provided with an inturned flange 24 having an inside diameter slightly greater than the outside diameter of the tube 15 which is to be coupled to the fitting. The flange 24 is provided radially inwardly with a longitudinally inwardly extending projection 25 which, as best seen in FIG. 4, is defined longitudinally inwardly by a longitudinally inwardly narrowing frusto-conical surface 26. The flange 24 is further defined by a radially outer, longitudinally inwardly facing annular radial surface 26a.

The retainer 13 comprises an annular springy member having a radial outer portion 27, and a frusto-conical inwardly narrowing inner portion 28 having its inside diameter similar to or slightly smaller than the outside diameter of the tube 15 to have binding engagement with the outer surface of the tube 15 in the madeup arrangement of the fitting as shown in FIG. 2. As shown in FIG. 4, the retainer may be provided with a plurality of circumferentially spaced relieved portions 29 along its inner periphery to permit facilitated tube-biting flexure thereof.

The sleeve 14 comprises a tubular resilient element preferably formed of an elastomeric material such as rubber. The inside diameter of the sleeve 14 is preferably similar to the outside diameter of the tube 15 and the outside diameter of the sleeve 14 is preferably slightly larger than the diameter of body bore portion 19 whereby the sleeve is slightly compressed between the tube and the body wall defining the bore portion 19 in the made-up condition of the fitting as shown in FIG. 2.

The assembly of the fitting 10 is best seen by successive reference to FIGS. 5 and 2. As illustrated in FIG. 5, the nut 12 is firstly installed on the tubing end 15 with the flange foremost. The retainer 13 and sleeve 14 are then successively installed within the nut bore 22 and concentrically about the tube end. The nut is then secured to the body 11 by the threading of nut portion 23 onto body portion 18. When the nut reaches the position of FIG. 5, further advance of the nut causes the sleeve 14 to be compressed between the wall of the body portion 19 and the outer surface of the tube 15 and to move into the bore end 19 as illustrated in FIG. 2. At the same time, the reaction in sleeve 14 to the compressive force causes the outer end of the sleeve to bear against the retainer portion 28 and more forcibly retain this portion in locked binding engagement with the outer surface of the tube 15. Thus, a positive retention of the tube against outward slippage is obtained from the binding engagement of the retainer 13 therewith, as well as the sealing gripping engagement of the sleeve 14 therewith and particularly at the inner end of the sleeve received in the bore portion 19.

The projection 25 of the nut flange positively precludes an axial inversion of the retainer portion 28 which might occur in the absence of such projection means as a result of an excessive outward pull on the tube 15 or by an excessive reaction from the sleeve 14 urging the portion 28 longitudinally outwardly relative to the outer portion 27. As shown, the diameter of the tip 30 of the retainer is somewhat smaller than the internal diameter of the flange 24. Thus, this portion may yield somewhat axially outwardly to provide an improved positive retention of the tube end, while yet the portion 28 is effectively precluded from axial inversion as discussed above. For improved support of the retainer portion 28, the angularity of surface 26 may be similar to the angularity of portion 28.

Thus, fitting 10 provides an improved positive retention of the tube 15 notwithstanding the presence of severe vibrations and high pressures. Still further, the arrangement of the springy retainer 13 and resilient sleeve 14 permits limited axial and transverse displacement of the tube 15 without loosening of the connection. The fitting is extremely simple and economical of construction and is readily made up and disassembled as desired.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A tube fitting comprising: a body having a bore opening outwardly through one portion thereof; a nut having a bore therethrough and an inturned, substantially rigid flange at an outer end of the nut, said flange defining a longitudinally inner annular surface having a radial, annular radially outer portion and a longitudinally inwardly narrowing, frusto-conical, annular radially inner portion accurately coaxial of said nut bore; means for connecting the nut to the body with the bore of the nut coaxially aligned with the bore of the body at said portion; an annular springy retainer coaxially between said body portion and said flange and having a radial, annular radially outer portion and a longitudinally inwardly narrowing, frusto-conical, annular radially inner portion complementary to and circumferentially continuously facially engaging said outer and inner portions respectively of said flange surface to be positively rigidly supported thereby at all times in accurate centered relationship to said nut bore, the inner diameter of said inner portion of the nut flange being slightly larger than the inner diameter of said inner portion of the retainer whereby the radially inner edge of the inner portion of the retainer is limitedly deflectable for biting into a tube extending coaxially through said nut bore and thereby preventing axially outward movement of the tube; and annular means for sealing the tube to said body and urging said retainer against each of said portions of said flange surface and said inner portion of the retainer against said tube.

2. The tube fitting of claim 1 wherein the radial extent of said deflectable edge is substantially less than the radial extent of said inner portion of the nut flange surface.

3. The tube fitting of claim 1 wherein the outer diameter of said annular seal mean is substantially less than the outer diameter of said radial outer portion of the retainer.

4. The tube fitting of claim 1 wherein the outer diameter of said outer portion of the retainer is less than the outer diameter of said outer portion of the nut flange annular surface.

References Cited by the Examiner

UNITED STATES PATENTS

| | | | |
|---|---|---|---|
| 2,158,757 | 5/1939 | Kuestermeier | 285—340 |
| 2,284,365 | 5/1942 | Briegel | 285—305 X |
| 2,341,164 | 2/1944 | Shimek | 285—340 |
| 2,474,319 | 6/1949 | Muller | 285—343 |
| 2,491,004 | 12/1949 | Graham | 285—340 X |
| 2,995,388 | 8/1961 | Morello et al. | 285—340 |
| 3,058,762 | 10/1962 | Howe | 285—340 |
| 3,140,107 | 7/1964 | Hynes | 285—340 |

THOMAS F. CALLAGHAN, *Primary Examiner.*

D. W. AROLA, *Assistant Examiner.*